(12) United States Patent
Doshi et al.

(10) Patent No.: US 9,229,818 B2
(45) Date of Patent: Jan. 5, 2016

(54) ADAPTIVE RETENTION FOR BACKUP DATA

(75) Inventors: Apurva Ashwin Doshi, Seattle, WA (US); Grigory Borisovich Lyakhovitskiy, Bothell, WA (US); Bohdan W. Raciborski, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 94 days.

(21) Appl. No.: 13/186,490

(22) Filed: Jul. 20, 2011

(65) Prior Publication Data
US 2013/0024423 A1 Jan. 24, 2013

(51) Int. Cl.
G06F 7/00 (2006.01)
G06F 11/14 (2006.01)

(52) U.S. Cl.
CPC .................................. G06F 11/1448 (2013.01)

(58) Field of Classification Search
CPC ........................ G06F 17/30085; G06F 11/1448
USPC ............................. 707/640, 999.203, 999.204
See application file for complete search history.

(56) References Cited

U.S. PATENT DOCUMENTS

| 6,079,000 | A | 6/2000 | Cooper |
| 6,189,016 | B1 | 2/2001 | Cabrera |
| 6,397,308 | B1 | 5/2002 | Ofek |
| 6,564,016 | B1 * | 5/2003 | Nakajima et al. ............. 396/311 |
| 6,625,623 | B1 | 9/2003 | Midgley |
| 6,629,110 | B2 | 9/2003 | Cane |
| 6,662,198 | B2 | 12/2003 | Satyanarayanan |
| 6,823,493 | B2 | 11/2004 | Baker |
| 7,162,587 | B2 | 1/2007 | Hiken |
| 7,167,880 | B2 * | 1/2007 | Amano et al. ........................ 1/1 |
| 7,168,001 | B2 | 1/2007 | Johnson |
| 7,240,104 | B2 * | 7/2007 | Gautney ........................ 709/221 |

(Continued)

FOREIGN PATENT DOCUMENTS

| CN | 1591345 A | 3/2005 |
| CN | 1783025 A | 6/2006 |

(Continued)

OTHER PUBLICATIONS

"Prevent Data Loss with Axcient", Retrieved at <<http://www.preventdataloss.net/>>, Retrieved Date: Mar. 31, 2011, pp. 4.

(Continued)

*Primary Examiner* — Miranda Le
(74) *Attorney, Agent, or Firm* — Judy Yee; Sunah Lee; Micky Minhas

(57) ABSTRACT

Aspects of the subject matter described herein relate to adaptive retention for backup data. In aspects, space may be needed on a backup storage in order to store additional backup data. In response, an indication that space is needed provided to a retention manager. The retention manager attempts to prune data on the backup storage to free up space on the backup storage. Before deleting a version on the backup storage, the retention manager determines whether deletion conditions are met. The retention manager may apply one or more retention policies in its efforts to free space. The retention manager may manage and free the space such that versions of files already stored are preserved for the longest possible time.

10 Claims, 8 Drawing Sheets

(56) References Cited

U.S. PATENT DOCUMENTS

| | | | |
|---|---|---|---|
| 7,243,094 B2* | 7/2007 | Tabellion et al. | 1/1 |
| 7,272,592 B2 | 9/2007 | Wyatt | |
| 7,346,586 B1 | 3/2008 | Walmsley | |
| 7,386,566 B2 | 6/2008 | Howey | |
| 7,441,092 B2 | 10/2008 | Lyon | |
| 7,464,126 B2 | 12/2008 | Chen | |
| 7,480,654 B2 | 1/2009 | Jujjuri | |
| 7,506,117 B2 | 3/2009 | Yamamoto | |
| 7,613,750 B2 | 11/2009 | Valiyaparambil | |
| 7,660,807 B2 | 2/2010 | Prahlad | |
| 7,702,618 B1 | 4/2010 | Patterson | |
| 7,720,819 B2 | 5/2010 | Lazzaro et al. | |
| 7,797,323 B1 | 9/2010 | Eshghi | |
| 7,809,685 B2 | 10/2010 | Wolff | |
| 7,822,927 B1 | 10/2010 | Scheer | |
| 7,830,571 B2 | 11/2010 | Ishizuka | |
| 7,831,561 B2* | 11/2010 | Wertheimer et al. | 707/640 |
| 7,831,789 B1 | 11/2010 | Per | |
| 7,860,832 B2 | 12/2010 | Midgley et al. | |
| 7,890,714 B1* | 2/2011 | Tsaur et al. | 711/162 |
| 7,899,662 B2 | 3/2011 | Brunet et al. | |
| 7,933,936 B2* | 4/2011 | Aggarwal et al. | 707/812 |
| 8,095,516 B2* | 1/2012 | Margolus et al. | 707/689 |
| 8,219,759 B2 | 7/2012 | Gokaraju | |
| 8,271,996 B1 | 9/2012 | Gould | |
| 8,296,398 B2 | 10/2012 | Lacapra | |
| 8,332,907 B2 | 12/2012 | Canning | |
| 8,341,367 B2* | 12/2012 | Akirav et al. | 711/162 |
| 8,346,731 B1 | 1/2013 | Tsaur | |
| 8,375,008 B1 | 2/2013 | Gomes | |
| 8,417,746 B1 | 4/2013 | Gillett, Jr. | |
| 8,484,356 B1* | 7/2013 | Douglis et al. | 709/226 |
| 8,527,556 B2 | 9/2013 | Vaitheeswaran | |
| 2001/0001870 A1 | 5/2001 | Ofek | |
| 2002/0073137 A1 | 6/2002 | Meadway | |
| 2004/0010524 A1 | 1/2004 | Wallace | |
| 2004/0030727 A1 | 2/2004 | Armangau | |
| 2004/0059870 A1 | 3/2004 | Ash | |
| 2004/0088331 A1 | 5/2004 | Therrien | |
| 2004/0088508 A1 | 5/2004 | Ballard | |
| 2004/0093323 A1 | 5/2004 | Bluhm | |
| 2004/0210607 A1 | 10/2004 | Manchanda | |
| 2005/0015466 A1 | 1/2005 | Tripp | |
| 2005/0050054 A1 | 3/2005 | Clark | |
| 2005/0076066 A1* | 4/2005 | Stakutis et al. | 707/200 |
| 2005/0187891 A1 | 8/2005 | Johnson | |
| 2005/0203851 A1 | 9/2005 | King | |
| 2005/0210041 A1 | 9/2005 | Taguchi | |
| 2006/0053182 A1 | 3/2006 | Sen | |
| 2006/0053347 A1 | 3/2006 | van Ingen | |
| 2006/0101384 A1 | 5/2006 | Sim-Tang et al. | |
| 2006/0106813 A1 | 5/2006 | Blumenau | |
| 2006/0116985 A1 | 6/2006 | Thind | |
| 2006/0117048 A1 | 6/2006 | Thind | |
| 2006/0117049 A1 | 6/2006 | Jain | |
| 2006/0117056 A1 | 6/2006 | Havewala | |
| 2006/0248039 A1 | 11/2006 | Brooks | |
| 2006/0248067 A1 | 11/2006 | Brooks | |
| 2007/0027935 A1 | 2/2007 | Haselton | |
| 2007/0028063 A1* | 2/2007 | Hars et al. | 711/162 |
| 2007/0038857 A1 | 2/2007 | Gosnell | |
| 2007/0136381 A1* | 6/2007 | Cannon et al. | 707/200 |
| 2007/0186127 A1 | 8/2007 | Desai | |
| 2007/0208918 A1 | 9/2007 | Harbin | |
| 2007/0248029 A1 | 10/2007 | Merkey | |
| 2007/0276843 A1 | 11/2007 | Lillibridge et al. | |
| 2008/0010322 A1 | 1/2008 | Lee | |
| 2008/0034004 A1* | 2/2008 | Cisler et al. | 707/200 |
| 2008/0034268 A1 | 2/2008 | Dodd | |
| 2008/0091895 A1 | 4/2008 | Chen | |
| 2008/0114730 A1 | 5/2008 | Larimore | |
| 2008/0243936 A1 | 10/2008 | Li | |
| 2008/0256140 A1 | 10/2008 | Lazzaro | |
| 2008/0288531 A1 | 11/2008 | Turski | |
| 2009/0089862 A1 | 4/2009 | Sun | |
| 2009/0100115 A1 | 4/2009 | Park | |
| 2009/0172273 A1 | 7/2009 | Piszczek | |
| 2009/0199199 A1 | 8/2009 | Pooni | |
| 2009/0204586 A1 | 8/2009 | Takahashi | |
| 2009/0216798 A1 | 8/2009 | Wahlert | |
| 2009/0228533 A1 | 9/2009 | Reddy | |
| 2009/0235150 A1 | 9/2009 | Berry | |
| 2009/0292677 A1 | 11/2009 | Kim | |
| 2010/0070515 A1 | 3/2010 | Dutton | |
| 2010/0106691 A1 | 4/2010 | Preslan | |
| 2010/0161617 A1 | 6/2010 | Cao | |
| 2010/0169591 A1 | 7/2010 | Atluri | |
| 2010/0274765 A1 | 10/2010 | Murphy | |
| 2010/0280999 A1 | 11/2010 | Atluri | |
| 2011/0010499 A1 | 1/2011 | Tsukamoto | |
| 2011/0016095 A1 | 1/2011 | Anglin | |
| 2011/0055559 A1 | 3/2011 | Li et al. | |
| 2011/0066805 A1 | 3/2011 | Janschitz | |
| 2011/0113466 A1 | 5/2011 | Stringham | |
| 2011/0131185 A1* | 6/2011 | Kirshenbaum | 707/654 |
| 2011/0173160 A1 | 7/2011 | Kryger | |
| 2011/0225141 A1* | 9/2011 | Chaudhry et al. | 707/709 |
| 2011/0246721 A1 | 10/2011 | Crisan | |
| 2011/0264635 A1 | 10/2011 | Yang | |
| 2011/0264875 A1 | 10/2011 | Watanabe | |
| 2012/0078855 A1* | 3/2012 | Beatty et al. | 707/676 |
| 2012/0158689 A1 | 6/2012 | Doshi | |
| 2012/0210084 A1 | 8/2012 | Carroll | |
| 2013/0018928 A1 | 1/2013 | Lacapra | |
| 2013/0066830 A1 | 3/2013 | Lacapra | |
| 2013/0066929 A1 | 3/2013 | Sedlar | |
| 2013/0191342 A1 | 7/2013 | Sreedharan | |
| 2013/0227604 A1 | 8/2013 | Shields | |
| 2014/0074809 A1 | 3/2014 | Patterson | |
| 2014/0188811 A1 | 7/2014 | Yang | |

FOREIGN PATENT DOCUMENTS

| | | |
|---|---|---|
| CN | 1783082 A | 6/2006 |
| CN | 1784677 A | 6/2006 |
| CN | 1991776 A | 7/2007 |
| CN | 101162469 A | 4/2008 |
| CN | 101201766 A | 6/2008 |
| CN | 101326497 A | 12/2008 |
| CN | 101601029 A | 12/2009 |
| JP | 2007-140777 A | 6/2007 |
| KR | 10-2009-0063733 A | 6/2009 |
| WO | 2007/021842 A2 | 2/2007 |
| WO | 2010/066816 A2 | 6/2010 |

OTHER PUBLICATIONS

"Google—data retention periods for different services (including deleted data)", Retrieved at <<http://blog.tech-and-law.com/2010/11/google-data-retention-periods-for.html>>, Nov. 6, 2010, pp. 8.

Boehm, et al, "File System Backup Using Change Journal", U.S. Appl. No. 12/959,401, filed Dec. 3, 2010, pp. 74.

Doshi, et al., "Protecting Data During Different Connectivity States", U.S. Appl. No. 12/973,902, filed Dec. 21, 2010, pp. 54.

EP Communication for Application No. 11845344.8-1954/2646943, Reference M11253EP, Sep. 15, 2014.

CN First Office Action for Application No. 201110394985.7, May 26, 2014.

Cui, "Duplicated data detection in multi-version backup", Application Research of Computers, Jan. 2009. (English Abstract Only).

Ji, "Video Plug-in Development for Material Exchange Format", Video Engineering, May 2007. (English Abstract Only).

Xu, "File Level Backup System Based on Content-addressed Storage", Computer Engineering, Aug. 2010. (English Abstract Only).

PCT International Search Report and Written Opinion for Application No. PCT/US2011/063050, Reference 330623-02, Jul. 25, 2012.

Microsoft Corporation, "Introduction to Microsoft Sync Framework File Synchronization Provider", Oct. 2009.

Soules, "Metadata Efficiency in Versioning File Systems", Proceedings of the 2nd USENIX Conference on File and Storage Technologies, Mar. 31-Apr. 2, 2003.

(56) References Cited

OTHER PUBLICATIONS

CN Third Office Action for Application No. 201110395113.2, Feb. 10, 2015.
Redi, "Mobile IP: A Solution for Transparent, Seamless Mobile Computer Communications", Fuji-Keizai's Report on Upcoming Trends in Mobile Computing and Communications, Jan. 1998.
Takasugi, "Seamless Service Platform for Following a User's Movement in a Dynamic Network Environment", Proceedings of the First IEEE International Conference on Pervasive Computing and Communications, Mar. 26, 2003.
Hejtmanek, "Scalable and Distributed Data Storage", Jan. 2005.
Satyanarayanan, "Towards seamless mobility on pervasive hardware", Pervasive and Mobile Computing, Science Direct, Elsevier, May 31, 2005.
Babineau, "Next Generation NAS: A market perspective on the recently introduced Snap Server 500 Series", Enterprise Strategy Group, Jun. 2006.
CN First Office Action for Application No. 201110432322.X, Dec. 17, 2013.
CN Second Office Action for Application No. 201110432322.X, Aug. 28, 2014.
CN First Office Action and Search Report for Application No. 201110432331.9, Jan. 6, 2014.
CN Search Report for Application No. 201110395113.2, Nov. 18, 2013.
"Copernic Desktop Search Has a New Improved Index", Copernic Blog, Jul. 29, 2010.
"Desktop search tools", Pandia Resources, Retrieved Sep. 22, 2010.
Jones, "Build a Web spider on Linux", Nov. 14, 2006.
Rebbapragada, "First Look: Tiger Lives Up to the Hype", PCWorld, Apr. 30, 2005.
"Windows Search Overview", Microsoft Corporation, Aug. 17, 2010.
PCT International Search Report and Written Opinion for Application No. PCT/US2011/063195, reference 330624-02, Jul. 24, 2012.
Cooperstein, "Keeping an Eye on Your NTFS Drives: the Windows 2000 Change Journal Explained", Microsoft Systems Journal, Sep. 1999.
"Base of a Differential Backup", Microsoft TechNet, Printed on Aug. 17, 2010.
CN Office Action for Application No. 201110395113.2, Aug. 7, 2014.
CN Notification to Grant Patent Right for Invention for Application No. 201110395113.2, Jun. 3, 2015.

\* cited by examiner

ADAPTIVE RETENTION FOR BACKUP DATA

BACKGROUND

Many people who have experience with computers recognize the value of backing up data that resides on the computer. Unfortunately, the complexity of backup solutions hinders users from creating and maintaining sufficient backup sets. Furthermore, as a user creates more and more versions of files, backup sets may grow to a point that they no longer fit on a target backup device. In addition, when multiple users share a computer, one user may consume a substantially larger portion of the target backup device.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to adaptive retention for backup data. In aspects, space may be needed on a backup storage in order to store additional backup data. In response, an indication that space is needed is provided to a retention manager. The retention manager attempts to prune data on the backup storage to free up space on the backup storage. Before deleting a version on the backup storage, the retention manager determines whether deletion conditions are met. The retention manager may apply one or more retention policies in its efforts to free space. The retention manager may manage and free the space such that versions of files already stored are preserved for the longest possible time.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
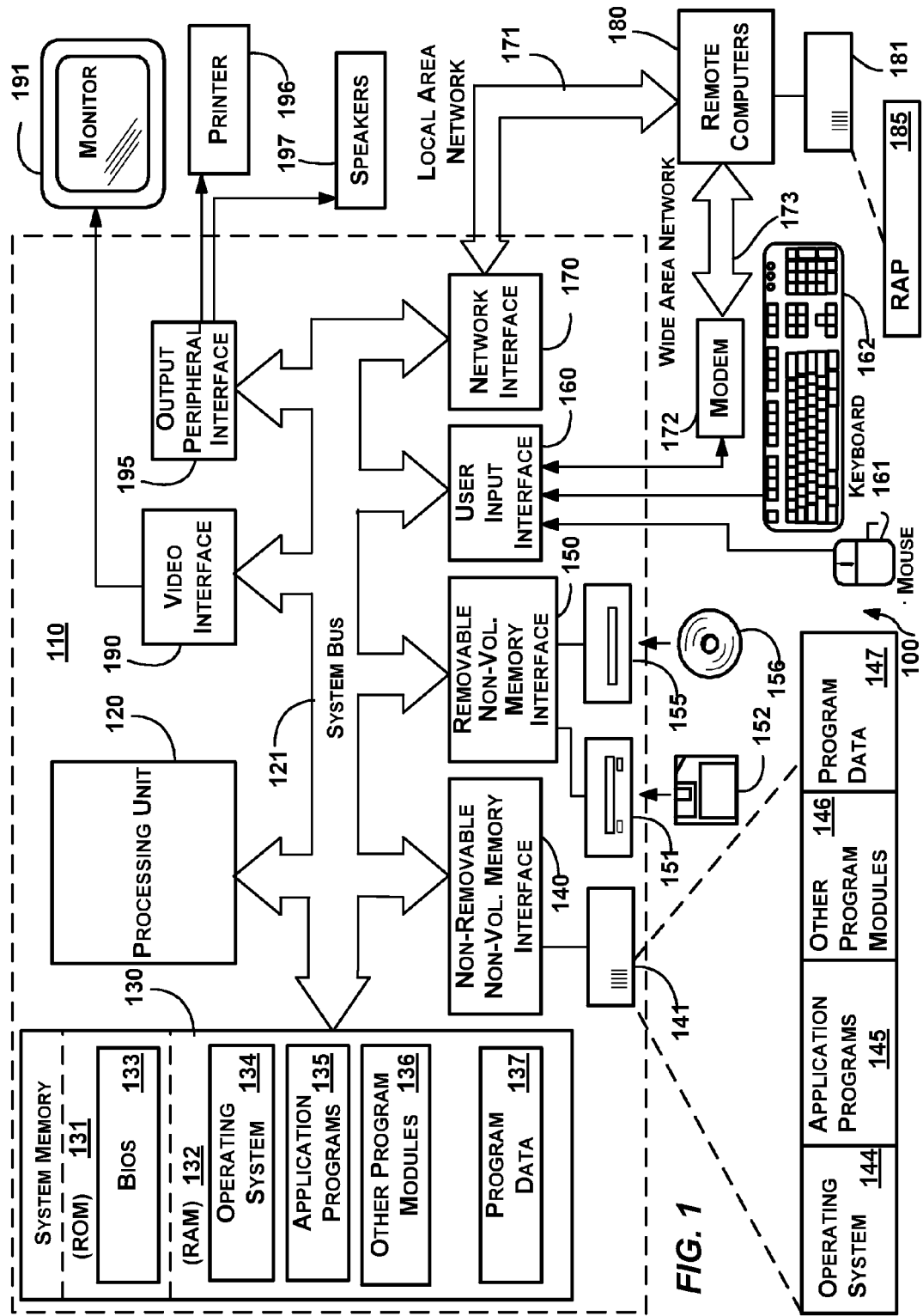
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Adaptive Retention

Figure 2:
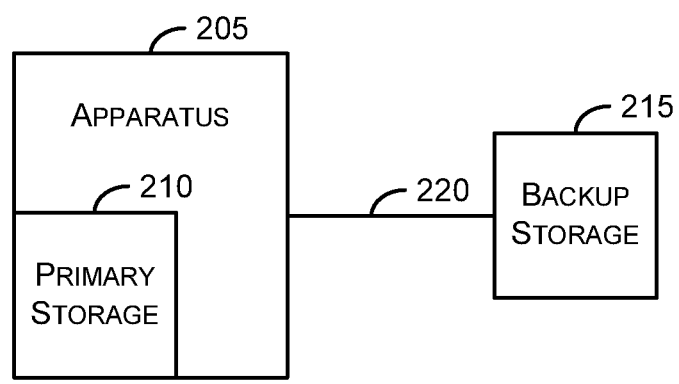
FIG. 2 is a block diagram that generally represents an exemplary environment in which aspects of the subject matter described herein may be implemented.

As mentioned previously, users who want to back up their data face several challenges. FIG. 2 is a block diagram that generally represents an exemplary environment in which aspects of the subject matter described herein may be implemented. As illustrated, the environment includes an apparatus 205 that includes a primary storage 210. The apparatus 205 may also be continuously or periodically connected to a backup storage 215.

The apparatus 205 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as the apparatus 205 comprises the computer 110 of FIG. 1.

The primary storage 210 may include any storage media capable of storing data. The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like. The primary storage 210 may be implemented using the computer storage media described in conjunction with FIG. 1.

In one embodiment, the primary storage 210 may be internal to the apparatus 205. In this embodiment, the primary storage 210 may be attached to the apparatus 205 in various ways as will be appreciated by those skilled in the art. As one example, the primary storage 210 may comprise a hard disk that is attached to an internal structure of the apparatus 205.

In another embodiment, the primary storage 210 may be external, or include components that are both internal and external to the apparatus 205. For example, the primary storage may include a USB storage device, an iSCSI connected storage device, and the like.

The primary storage 210 may include one or more physical devices that are of the same or different types. The one or more physical devices may be formatted with a file system. The apparatus 205 may rely on the primary storage 210 as the default storage to store file system objects (hereinafter sometimes referred to as files).

The line 220 represents a connection from the apparatus 205 to the backup storage 215. The computer may be connected to the backup storage 215 in a variety of ways. For example, the computer may be connected to the backup storage 215 via direct wired media such as a USB cable, IEEE 1394 cable, fiber-optic cable, or other physical media, wireless media such as RF, infrared, and other wireless media, and the like. The line 220 may represent a network that includes servers, routers, switches, and other networking devices, and the like that logically connect the apparatus 205 to the backup storage 215.

Figure 5:
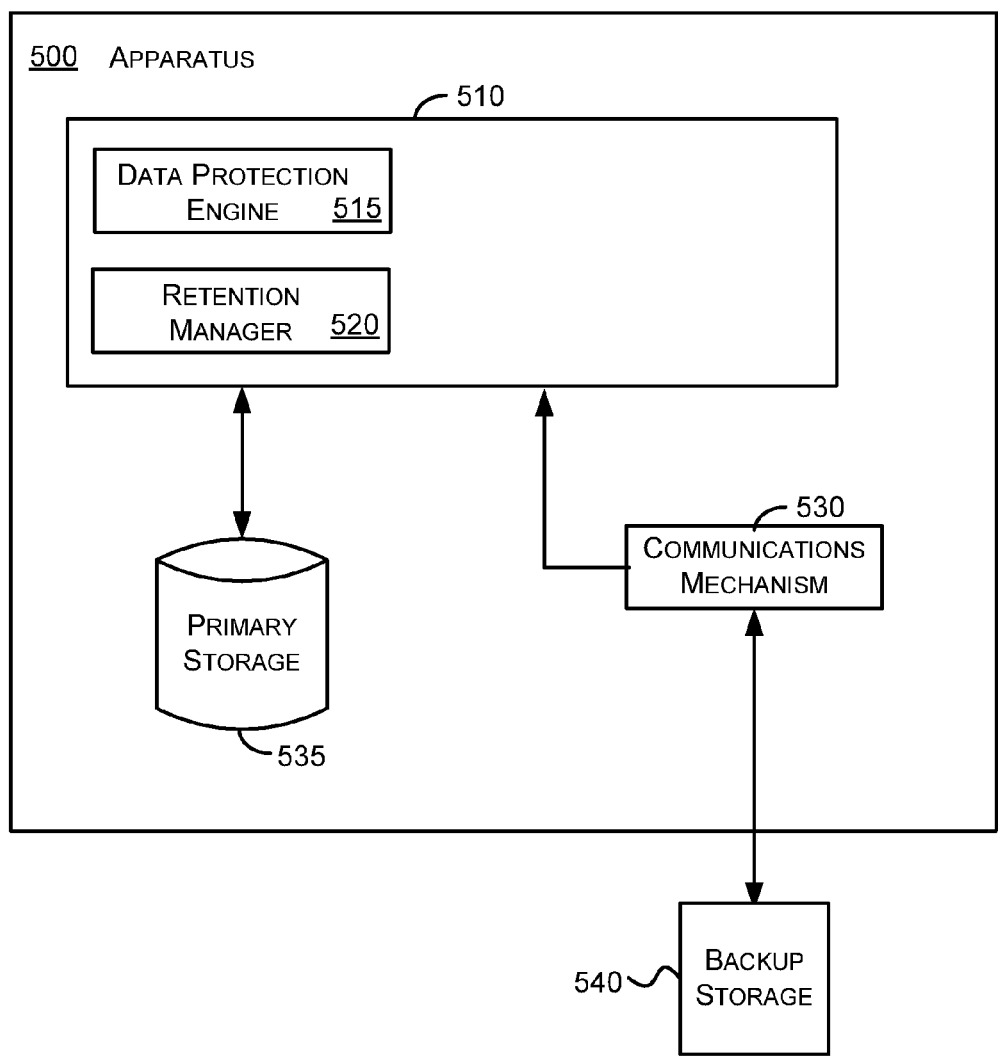
FIG. 5 is a block diagram that represents a system configured in accordance with aspects of the subject matter described herein.

The apparatus may host data protection components as illustrated in FIG. 5. These data protection components may retain backup copies of versions of files for a user on backup storage based on a retention policy used for the user.

In one embodiment, a user may select a retention policy for retaining backup versions of the user's files. Some examples of retention policies include:

1. No retention policy (aka keep every version). If a user selects this policy or does not select any policy, all versions may be kept on backup storage. When the backup storage is full or crosses a threshold, the user may be notified of the state of the backup storage. The user may then select a backup retention policy, perform manual pruning, or take other actions as appropriate.

2. Let system choose. In this retention policy, versions of files that belong to one or more backup sets (starting with the oldest backup set and moving to more recent backup sets as needed) are deleted, provided that a version of a protected file is not deleted unless at least one backup copy of a more recent version of the protected file remains on the backup storage. A backup set is a group of versions of changed files that were backed up together and during the same data protection cycle (e.g., a data protection cycle that commenced at 1:00 p.m.). The deletion restriction above does not apply to versions of files that were permanently deleted on the source storage. In that case, even the last version may be deleted. Execution of this retention policy stops if no versions can be found that meet the retention policy criteria. This rule may be applied to make sure that a protected file can be restored as this policy ensures that at least one at least one replicated version of each protected file exists.

3. Keep backups for N days. With this retention policy, versions of files that belong to one or more backup sets (starting with the oldest backup set and moving to more recent backup sets as needed) are deleted, as long as they are older than N days and not enough space has been freed to allow more versions to be backed up to the backup storage. Similarly to the previous policy, pruning using this retention policy excludes the most recent backup copy of each protected file unless the file has been permanently deleted on the source storage.

4. Fixed date retention (aka manual cleanup). Any backup sets older than a certain date are pruned, provided that at least one backup copy of each protected file remains on the backup storage.

The fixed date retention policy may be triggered in response to user input that indicates that a manual cleanup is desired. Applying the fixed date retention policy is equivalent to a one-time application of the "keep backups for N days" policy, except that in this case the data protection engine does not stop after a certain amount of disk space is freed. Instead, the data protection engine stops deleting versions only after all backup sets that are older than N days have been pruned.

The exemplary policies above are not intended to be all-inclusive or exhaustive. Based on the teachings herein, those skilled in the art may recognize other retention policies that may be employed without departing from the spirit or scope of aspects of the subject matter herein.

Furthermore, reference counting or some similar mechanism may be used to reduce redundancy of data stored on the backup storage without departing from the spirit or scope of aspects of the subject matter described herein. For example, a catalog or other data structure may track when data that is common across multiple versions of a file or even across files is no longer used. A retention manager may wait to delete the data until it is no longer used for any version or file on the backup storage.

Figure 3:
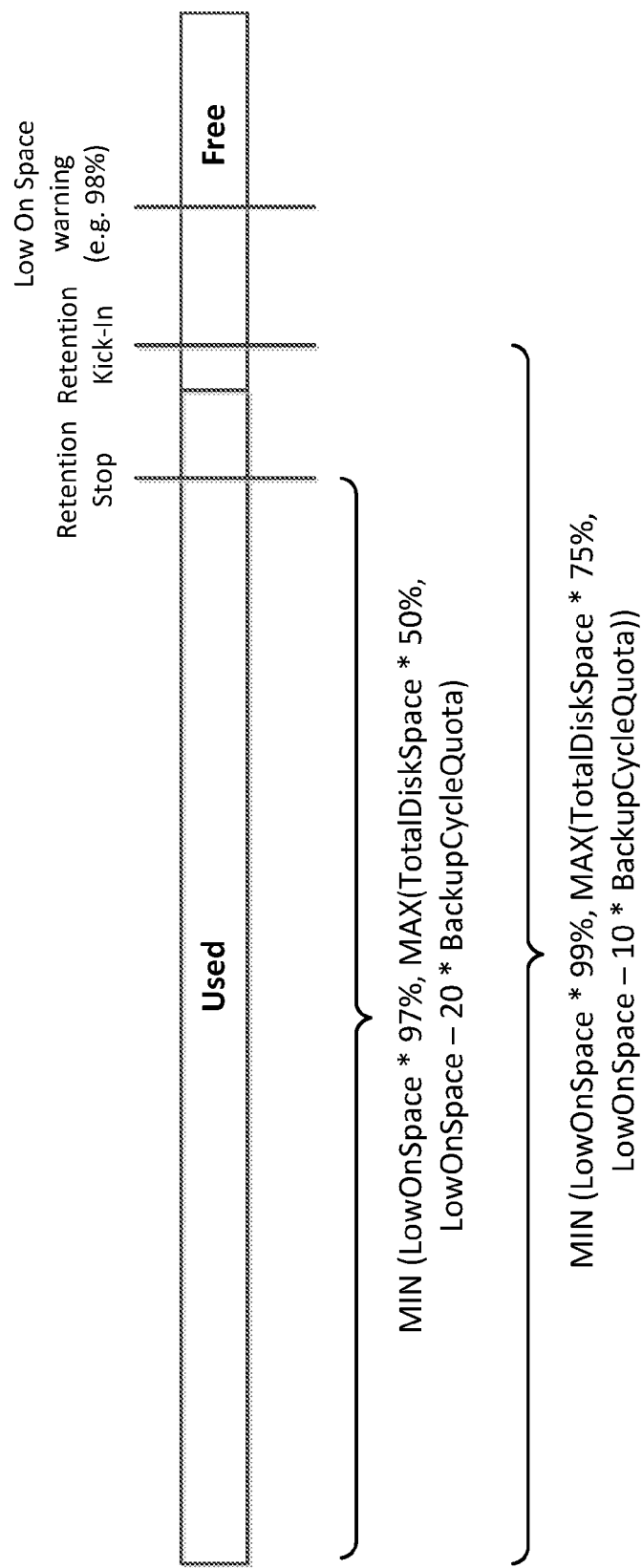
FIG. 3 is a diagram that represents events for triggering applying a retention policy in accordance with aspects of the subject matter described herein.

Applying a retention policy may be triggered by an event of crossing a threshold, for example. FIG. 3 is a diagram that represents events for triggering applying a retention policy in accordance with aspects of the subject matter described herein. For example, a data protection engine may apply a selected retention policy during a backup cycle in situations including the following:

1. If the data protection engine determines that the amount of the available free space on the backup storage is equal to or less than a "Retention Kick In" threshold, the data protection engine may apply a retention policy. In this case, in applying the retention policy, the data protection engine attempts to ensure that the amount of free space is equal or greater than the "Retention Stop" threshold as described in more detail below.

2. If the data protection engine is about to copy a version of a file to the backup storage and the data protection engine determines that the amount of the available free space on the backup storage would drop below the "Retention Kick In" threshold after copying the file, the data protection engine may apply a retention policy. In this case, the data protection engine attempts to free up enough space to ensure that the amount of free space after copying the file is equal to or greater than the "Retention Stop" threshold as described in more detail below.

3. If the last retention cycle has not fully completed, this may trigger the application of a retention policy. The last retention cycle may not fully complete, for example, if the previous backup cycle was cancelled (e.g., the user pressed the "Cancel" button, the machine was shut down, or the like). In this case, the data protection engine may stop, set a flag in metadata indicating that the oldest present backup set is incomplete, and gracefully flush the metadata to the disk. One of the first actions performed on the next cycle is to complete retention for the oldest present backup set, after which the flag is removed from the metadata.

The situations indicated above are not intended to be all-inclusive or exhaustive. Indeed, based on the teachings herein, those skilled in the art may recognize other situations that may trigger the application of a retention policy without departing from the spirit or scope of aspects of the subject matter described herein.

When the free space on the backup storage is less than the Retention Kick In threshold, this may trigger an indication to the data protection engine to apply a retention policy to prune versions from the backup storage. After a sufficient number of backup sets have been pruned from the backup storage, the free space on the backup storage may cross the Retention Stop threshold. At this point, the data protection engine may stop the pruning process.

If while applying a retention policy, the data protection engine is not able to free enough space to make room for files to be added to the backup storage, the data protection engine may report an error. The error may indicate, for example, that the data protection engine failed to protect one or more files due to an overly strict retention policy, an insufficiently large target, or some other factor.

The data protection engine may also show a warning when the free space is less than the low on space threshold. Normally, the free space will not get this low, but if the data protection engine is unable to free enough space and additional versions are copied to the target, the low on space threshold may be crossed.

Some exemplary formulas for calculating the retention kick in and the retention stop thresholds are illustrated in FIG. 3, but there is no intention to limit these thresholds to only these formulas. Other formulas and different values for the formulas shown may also be used without departing from the spirit or scope of aspects of the subject matter described herein. In one embodiment, the values and formulas are configurable by a system administrator, end user, or the like. One characteristic that needs to be preserved, however, is that the Retention Stop threshold is associated with more free space than the Retention Kick In threshold which in turn is associated with more free space than the Low On Space threshold.

When older versions of files are deleted, they may be deleted in such a way to make folders that contain the files consistent. For example, in one implementation, a file may only be deleted in conjunction with deleting the rest of the files of a backup set that includes the file. A backup set may include, for example, all files that are backed up to a backup storage in a backup cycle.

Figure 4:
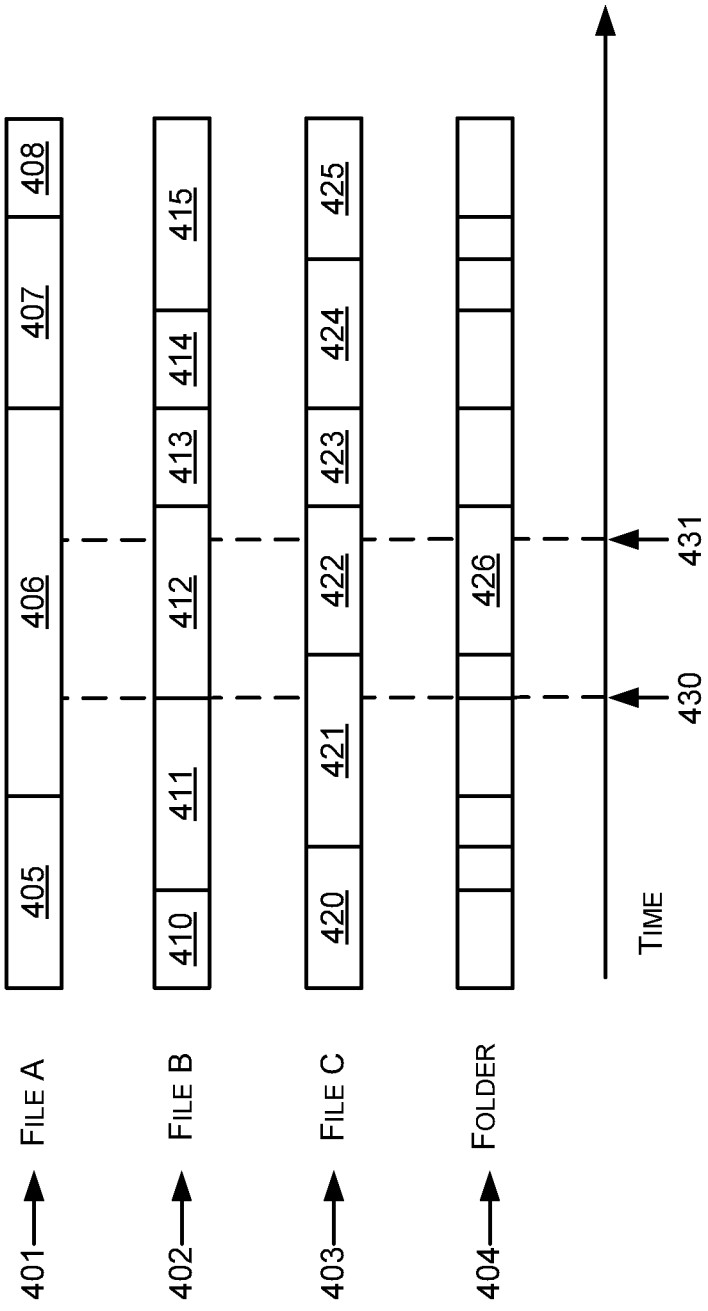
FIG. 4 is a block diagram that illustrates versions of exemplary files and a folder that may be backed up in accordance with aspects of the subject matter described herein.

FIG. 4 is a block diagram that illustrates versions of exemplary files and a folder that may be backed up in accordance with aspects of the subject matter described herein. As illustrated, there are files 401-403 and a folder 404 that includes the files 401-403. The file 401 has versions 405-408. The file 402 has versions 410-415. The file 403 has versions 420-425. The folder is also divided into versions that are not numbered except for version 426. The versions 405-408, 410-415, and 420-425 represent different versions of the files 401-403, respectively, as the versions existed at certain times. The last versions 408, 415, and 425, may be represented such that they extend out to infinity or the latest time representable by a backup system.

The folder 404 includes a new version each time one or more files has a new version. In one implementation, to maintain a consistent view of the files in the folder 404, pruning of files may be restricted to endpoints of the versions of the folder 404. For example, a pruning at the time 430 meets this restriction. In another implementation, this restriction may be lifted. For example, a pruning at time 431 is not at the endpoint of a version.

If pruning at time 430 is desired, all versions that exist prior to and up to the time 430 and that do not extend past the time 430 are deleted. For example, for pruning at time 430, the versions 405, 410, 411, and 420 and the versions of the folder 404 that end at or before the time 430 are deleted, but other versions including 406 and 421 are not deleted because they do not meet the criteria above.

If pruning is allowed at times other than at directory version endpoints, and pruning is performed at, for example, time 431, then the versions 405, 410-411, 420, 421, and directory versions before 426 are deleted while no other versions are deleted.

Furthermore, when pruning occurs, the effective start times of versions that extend through the pruning time may be adjusted. For example, if pruning occurs at time 430, metadata regarding the versions 406 and 421 may be adjusted to indicate that the effective start times of these versions is time 430 instead of their original start times.

This may be done, for example, to show a consistent folder view. For example, if a user wants to see a folder as it existed at time 430, this data may be used to show that the versions 406, 412, and 421 existed at time 430.

In conjunction with storing backup copies of files on backup storage, a catalog that includes data regarding the versions stored on the backup storage may also be flushed to the backup storage. This may be done, for example, in case the catalog becomes corrupted or deleted from the source machine from which the backup copies were copied. The catalog can then be used to re-construct the protected files.

In pruning versions from the backup storage, some conditions have been mentioned. For example, a version may not be pruned from the backup storage if the version is the last existing (i.e., most recent version) copied to the backup storage of its corresponding file on the source machine but the original file still exists. If the original file was permanently deleted, this rule does not apply. As another example, a version may not be deleted if the version's existence extends (e.g., the version was visible) past the pruning time as mentioned previously in conjunction with FIG. 4. Besides the exemplary conditions mentioned above, in one implementation, a version may not be pruned if the version was visible the last time that a catalog was stored on the backup storage. This may be done so that the catalog may be used in case the source machine's catalog is deleted, lost, or becomes corrupted.

To deal with the above condition regarding the catalog, in some cases, the data protection engine may need to go through several backup cycles to copy new versions of files onto the backup storage. For example, in a first cycle the data protection engine may copy some of the new files to the backup storage and flush a new catalog to the backup storage. The retention manager may then be called to free space. After the retention manager has deleted free space for older versions of the new files, the data protection engine may copy another set of new files to the backup storage and flush another new catalog to the backup storage. This process may repeat until all of the new files to be protected are copied to the backup storage.

From time to time a user may desire to associate a different computer with the user's backups on a backup storage. For example, the user's hard drive may crash and need to be replaced, the user may lose the user's computer and replace the computer with another computer, the user may decide to upgrade the user's computer to a new computer, and the like. To deal with this, a backup system in accordance with the teachings herein may provide a user interface or other mechanism that allows the new computer to be associated with the user's backup data on the backup storage. When this occurs, to avoid pruning backed up files, the retention policy may be set to keep every version. After the user has recovered desired files to the new machine, the user may select a different retention policy.

The data protection engine may use a staging area on the local storage for use in backing up files from the local storage to the backup storage. In this case, a version of a file may have been copied to the staging area of the local storage, but not to the backup storage. In this case, if the retention manager wants to delete a version of the file, it may delete namespace metadata that refers to the version that is in the staging area rather than a previous version of the file that has already been copied to the backup storage.

When a target backup storage is used by multiple users and/or multiple machines, additional challenges may be encountered. For example, if two users, A and B, share a target, user A may consume much more space than user B as the target gets full. If B has versions that need to be backed up, space on the target may be freed by proactively applying a retention policy when the target starts approaching the "target low on free space" threshold. If user A and user B use the same free space threshold value and select an automatically applied retention policy, the data protection engine may delete old backup sets for user A even if user A does not generate any new churn.

A user of a shared target may select the "no retention policy" mentioned previously. In this case, retained versions of files of the user may fill up the target. In this case, when the target is full or approaches a threshold, a user may receive a warning message explaining that the user needs to have one or more other users perform manual cleanup, change retention policies, or provide another target.

If machine A and machine B both use the same target and a problem occurs on machine A (e.g., machine A no longer works, is broken, lost, or otherwise unavailable to connect with the target), the backup copies created by machine A may stay on the target indefinitely unless other actions are taken. One such action is to have another machine associate itself with A's backups. After the other machine is associated with A's backups, retention policies may be applied as desired. Initially, the retention policy for a newly associated machine may be set to keep everything so that the user is able to recover backed up files before they might get deleted to make room for other files. Another action is to delete the directories on the target that belong to machine A.

A common public folder may be shared by two or more users or machines that use the mechanisms described herein to backup versions of files of the common public folder. In one embodiment, the retention policies of the current logged on user are applied if versions of files of the common public folder are to be deleted—even if the retention policies of the two or more users are different. In another embodiment, one of the user/machine retention policies may be applied if versions of files of the common public folder are to be deleted. In this case, the retention policies to apply to versions of files of the common public folder may be selected by an administrator or the like. In another embodiment, the most aggressive or least aggressive retention policy may be automatically selected and applied. In yet another embodiment, a combination of the retention policies may be applied. In yet another embodiment, retention policies other than the individual user/machines policies may be associated with the common public folder and applied if versions of files of the common public folder are to be deleted.

FIG. 5 is a block diagram that represents a system configured in accordance with aspects of the subject matter described herein. The components illustrated in FIG. 5 are exemplary and are not meant to be all-inclusive of components that may be needed or included. In other embodiments, the components described in conjunction with FIG. 5 may be included in other components (shown or not shown) or placed in subcomponents without departing from the spirit or scope of aspects of the subject matter described herein. In some embodiments, the components and/or functions described in conjunction with FIG. 5 may be distributed across multiple devices.

Turning to FIG. 5, the apparatus 500 may include data protection components 510, a primary storage 535, a communications mechanism 530, and other components (not shown). The apparatus 500 corresponds to the apparatus 205 and may be implemented as the apparatus 205 may be implemented.

The communications mechanism 530 allows the apparatus 500 to communicate with other entities. For example, the communications mechanism 530 may allow the apparatus to communicate with one or more devices (e.g., network attached storage, a storage area network device, a file server, or the like) that store backup copies of files included on the primary storage 535. The communications mechanism 530 may be a network interface or adapter 170, modem 172, USB or other port, or any other mechanism for establishing communications as described in conjunction with FIG. 1.

The primary storage 535 is any storage media capable of storing data including files of the apparatus 500. The primary storage 535 may be implemented with a file system, database, volatile memory such as RAM, other storage, some combination of the above, and the like and may be distributed across multiple devices. The primary storage 535 may be external, internal, or include components that are both internal and external to the apparatus 500. The primary storage 535 may operate similar to the primary storage 210 of FIG. 2.

The backup storage 540 also includes any storage media capable of storing data. The backup storage 540 is external to the apparatus 500 and may be stand alone or implemented on a server. The backup storage 540 may be implemented using a file system, database, nonvolatile memory, volatile memory such as RAM, other storage, some combination of the above, and the like and may be distributed across multiple devices. The backup storage 540 may operate similar to the backup storage 210 of FIG. 2.

The data protection components 510 may include a data protection engine 515, a retention manager 520, and other components (not shown). As used herein, the term component is to be read to include hardware such as all or a portion of a device, a collection of one or more software modules or portions thereof, some combination of one or more software modules or portions thereof and one or more devices or portions thereof, and the like.

The data protection engine 515 may operate to copy versions of files from the primary storage 535 to the backup storage 540. When the data protection engine 515 needs more space on the backup storage or a user has indicated that pruning is to occur, the data protection engine 515 may invoke the retention manager 520 to prune backup sets from the backup storage 540.

The retention manager 520 may operate to apply a retention policy to the backup sets stored on the backup storage 540. In applying a retention policy, the retention manager 520 may perform pruning actions. Some exemplary pruning actions include:

1. Determining an oldest backup set that is currently stored on the backup storage 540. In one implementation, the retention manager 520 may maintain data that indicates the oldest backup set that is currently stored on the backup storage 540. In this implementation, the retention manager 520 may access this data to determine the oldest backup set. The retention manager 520 may also be able to scan the backup storage 540 to locate data such as one or more catalogs and to use this data to determine the oldest backup set that is current stored on the backup storage.

Where more than one user store version copies on the backup storage, the retention manager 520 may look for the oldest backup set for a user (e.g., a user who is logged onto the computer, an indicated user, or the like). For example, when two or more users share a backup storage, some of the backup sets may be for files of one of the users while the other backup sets may be for files of the other user. In one implementation, a retention manager 520 may only prune backup sets for the user who is logged onto a computer from which the backup sets are created. In one embodiment, the retention manager 520 may run as a user process and may only access those files that the user may access.

After determining the oldest backup set, the retention manager may determine whether the retention policy applies to the backup set. If not, pruning actions may cease. If so, the actions may continue as indicated below.

2. Determining one or more versions of file system objects of the first backup set that meet one or more deletion conditions. As mentioned previously, a version may be pruned if it meets certain conditions (e.g., the version does not extend beyond the pruning time, deleting the version will not cause the catalog to be deleted, the version is not the most recent version of a file that still exists on the source storage, and the like).

3. Deleting the versions determined in step 2 above from the backup storage. Deleting a version may involve marking the version for deletion, changing metadata to indicate that the version is deleted, decrementing a reference count associated with the version, physically overwriting the version with other data or data patterns, or the like.

4. Updating pruning data to point to the next backup set that will be deleted if more space is needed. The next backup set has a backup date that is more recent than the backup date of the backup set just deleted but older than any backup date of any other backup set currently stored on the backup storage for the indicated user. In other words, the next backup set is the very next backup set that occurred after the just deleted backup set.

Where reference counting is used to reduce redundancy on the backup storage, in one exemplary implementation, the above actions may be performed by reducing the reference counts for each version in the oldest backup set where the version meets the deletion conditions. If this causes a reference count to go to zero for a file, data representing the file may be deleted. Reducing the reference count may involve decrementing a counter, causing a pointer to not point to the data, or the like.

The retention manager 520 may be further operable to determine if free space on the primary storage 535 exceeds a threshold (e.g., a Retention Stop threshold, a parameter of space to free passed in by the data protection engine, or the like), and if not to potentially repeat the pruning actions.

The retention manager 520 may repeat the pruning actions until no version on the backup storage meets the one or more deletion conditions. This may occur, for example, in response to a user issuing a manual cleanup command, when space is low on the backup storage and there are no more versions that can be deleted without violating the deletion conditions, or in other circumstances. The retention manager may operate to maintain on the backup storage 540 at least one version of each protected file that exists on the primary storage 535.

The retention manager 520 may be further operable to provide an error message if the retention manager 520 is unable to free an amount of space indicated by the data protection engine 515. For example, if the retention manager 520 is unable to free the space requested by the data protection engine 515, the retention manager may return a code that indicates this together with information that indicates how much space the retention manager 520 was able to free.

Figure 6:
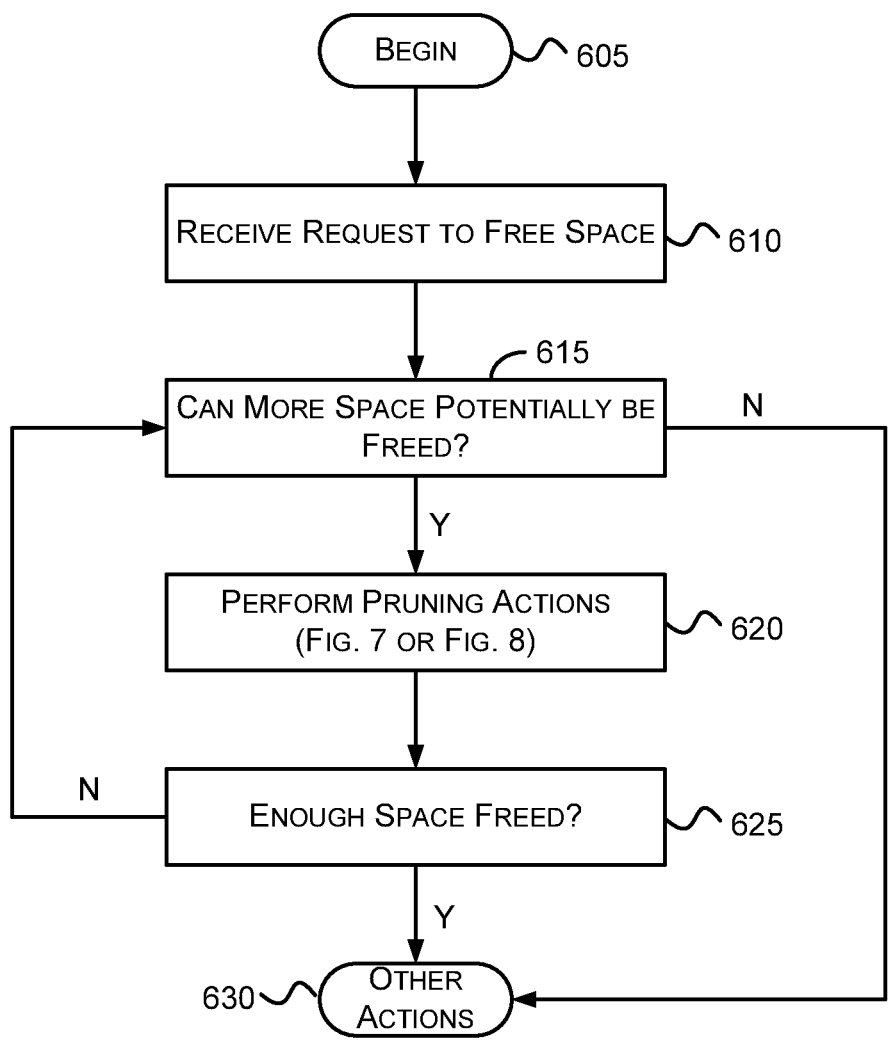
FIGS. 6-8 are flow diagrams that generally represent exemplary actions that may occur in accordance with aspects of the subject matter described herein.
Figure 7:
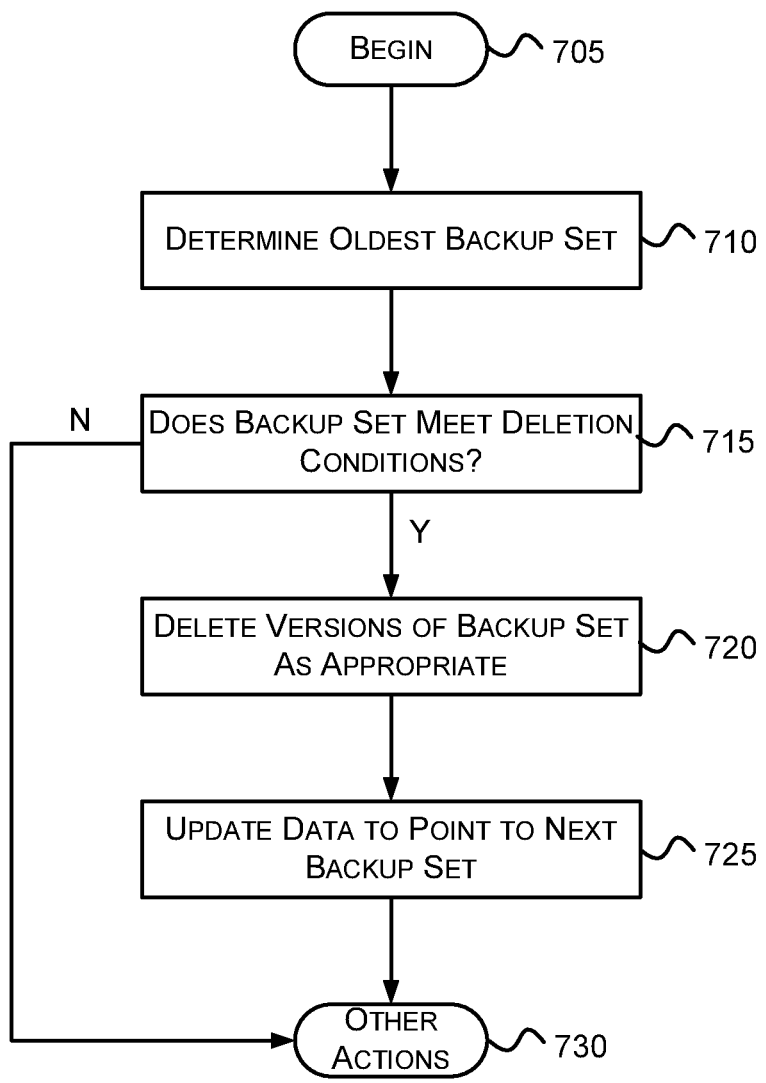
Figure 8:
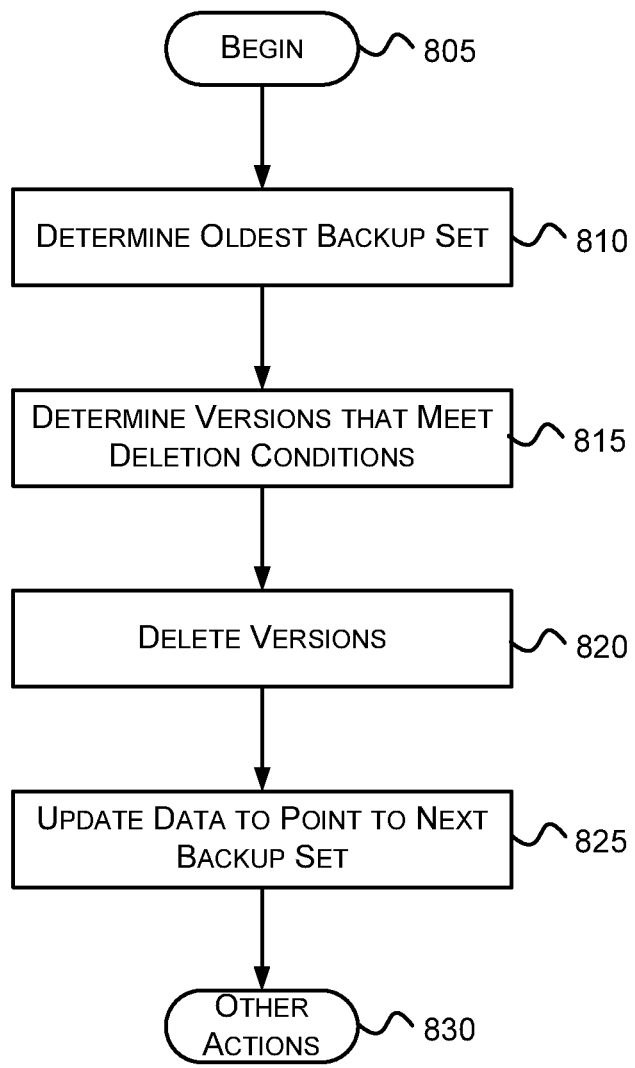

FIGS. 6-8 are flow diagrams that generally represent exemplary actions that may occur in accordance with aspects of the subject matter described herein. For simplicity of explanation, the methodology described in conjunction with FIGS. 6-8 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 6, at block 605, the actions begin. At block 610, a request to free space is received. For example, referring to FIG. 5, the data protection engine 515 may send an indication to free space to the retention manager 520. The indication may indicate that additional free space is needed on the backup storage 540. In one embodiment, the indication may be provided as a function call, message, or some other communication means and may include data that indicates an amount of space to free.

At block 615, a determination is made as to whether more space can be freed. For example, referring to FIG. 5, the retention manager 520 may determine whether any more backup sets may be freed without violating deletion conditions. If not, no more space can be freed by the retention manager 520 until other actions are taken. The data protection engine 515 may work with the retention manager 520 to free more space. For example, as indicated previously, the data protection engine 515 may upload a catalog to the backup storage and call the retention manager 520 again so that the retention manager can free additional space.

At block 620, the pruning actions are performed. For example, referring to FIG. 5, the retention manager 520 may prune versions of the oldest backup set from the backup storage 540 to free space on the backup storage 540. Some exemplary pruning actions are described in conjunction with FIGS. 7 and 8.

At block 625, a determination is made as to whether enough space was freed by the pruning actions. For example, referring to FIG. 5, the retention manager 520 may determine if pruning a backup set made enough space available on the backup storage 540. "Enough" may be measured by the indication passed to the retention manager 520. For example, if the data protection engine 515 passed a parameter requesting that 10 megabytes of space is to be freed, this may be used. As another example, if the data protection engine 515 passed a parameter that indicates that total space that needs to be free on the backup storage 540, this may be used.

In one embodiment, the retention manager 520 deletes all eligible versions of a backup set before determining if enough space has been made available on the backup storage 540. An eligible version is a version that can be deleted without violating a deletion condition (e.g., the version is not the most recent version of a protected file that still exists on the source storage).

As another example, the data protection engine 515 may pass a parameter that indicates that the retention manager 520 is to delete all but the latest version of each file stored on the backup storage that is still stored on a source storage (e.g., the primary storage 535 of FIG. 5). In one implementation, this may be indicated by a value (e.g., something that represents infinity or a maximum value representable) that indicates freeing the maximum amount of space.

The retention manager 520 may use the passed data to determine if space freed by the pruning actions exceeds the additional free space needed. If the space freed does not exceed the additional free space needed, the retention manager 520 may repeat the pruning actions potentially multiple times.

If enough space has been freed, the actions continue at block 630; otherwise, the actions continue at block 625.

At block 630, other actions, if any, may be performed. For example, the data protection engine of FIG. 5 may monitor free space on the backup storage 540. If the free space is below a threshold as indicated previously, the data protection engine 515 may provide the indication mentioned in conjunction with block 610.

Turning to FIG. 7, at block 705, the actions begin. At block 710, a determination is made as to the oldest backup set that is currently stored on the backup storage for a user. For example, referring to FIG. 5, the retention manager 520 may maintain data (e.g., a pointer, index, or the like) that indicate the oldest backup set that is currently stored on the backup storage for a user. The retention manager 520 may use this data to determine the oldest backup set. Alternatively, the retention manager 520 may scan the backup storage 540 to find catalogs or other data to determine the oldest backup set.

At block 715, a determination is made as to whether the backup set meets one or more deletion conditions. For example, different policies may have some different conditions for deleting a backup set. For example, referring to FIG. 5, the retention manager 520 may determine if the backup set satisfies conditions of a user retention policy.

At block 720, one or more versions of the backup set may be deleted as appropriate. Deletion may include not physically deleting the data associated with the version. For example, as mentioned previously, metadata regarding the version may be updated so that the version is not visible or otherwise appears deleted during certain time periods. In addition, a catalog may use space saving techniques such that a version is not deleted until all records that point to the version are deleted.

Furthermore, some versions of a backup set may not be deleted. Such versions may not meet one or more deletion conditions established for deleting versions. For example, determining whether the version meets one or more deletion conditions may include determining if the version was visible no later than a pruning time associated with the pruning actions. This pruning time may be, for example, a date before which versions are to be deleted. Several conditions have been mentioned previously.

As another example, determining whether the version meets one or more deletion conditions may include determining whether the version was visible no later than a last time that a catalog was stored on the backup storage where the catalog includes data regarding versions stored on the backup storage.

As yet another example, determining whether the version meets one or more deletion conditions may include determining whether the version is the only version stored on the backup storage for a file that exists on the primary storage.

Where a reference counting mechanism is used, when a version is "deleted" the reference count may be decremented. The reference count may be represented by pointers that point to data, via a value, or otherwise, without departing from the spirit or scope of aspects of the subject matter described herein. If the reference count is zero or otherwise indicates that all references to the data have been deleted, the data representing the version may also be deleted.

At block 725, pruning data may be updated to indicate the next backup set to prune. For example, the pruning data may be updated to indicate a second backup set that is currently stored on the backup storage, where the second backup set has a backup date that is more recent than the backup date of the backup set just pruned but older than any backup date of any other backup set currently stored on the backup storage for the indicated user.

At block 730, other actions, if any, may be performed. For example, the actions may continue at block 625 of FIG. 6 to see if enough space has been freed or if more space can be freed.

Turning to FIG. 8, at block 805, the actions begin.

At block 810, a determination is made at to the oldest backup set that is currently stored on the backup storage for a user. For example, referring to FIG. 5, the retention manager 520 may maintain data (e.g., a pointer, index, or the like) that indicate the oldest backup set that is currently stored on the backup storage for a user. The retention manager 520 may use this data to determine the oldest backup set. Alternatively, the retention manager 520 may scan the backup storage 540 to find catalogs and other data to determine the oldest backup set.

In addition, a determination may be made as to whether the retention policy applies to the oldest backup set. If not, pruning may cease; otherwise, an additional check may be made on the versions of the oldest backup set as mentioned below.

At block 815, a determination is made as to versions of the backup set that meet deletion conditions. For example, referring to FIG. 5, the retention manager 520 may indicate versions of the backup set that meet the deletion conditions previously mentioned.

At block 820, the versions that meet the deletion conditions may be deleted. For example, referring to FIG. 5, the retention manager 520 may "delete" versions determined at block 815.

At block 825, data may be updated to point to the next backup set to prune. For example, referring to FIG. 5, the retention manager 520 may update data to indicate the next backup set to prune.

At block 830, other actions, if any, may be performed. For example, referring to FIG. 5, the retention manager 520 may update metadata to adjust effective start times of the one or more versions so that queries may return consistent results. As another example, the actions may continue at block 625 of FIG. 6 to see if enough space has been freed or if more space can be freed.

As can be seen from the foregoing detailed description, aspects have been described related to adaptive retention of backup data. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method performed on a computing device, the method comprising:
   receiving, by the computing device, an indication that, prior to a completion of a started backup procedure, additional free space is needed on a backup storage to complete the started backup procedure, where the received indication comprises a notification that a free space capacity on the backup storage is less than or equal to a first threshold, and where the receiving comprises receiving a value that indicates a maximum amount of space to free; and
   performing, by the computing device in response to receiving the indication, pruning actions until the free space capacity is equal to or greater than a second threshold, the pruning actions comprising:
      determining a first backup set that is associated with a particular user and that is currently stored on the backup storage, the first backup set having a first backup date, the first backup date being oldest of all backup dates for backup sets that are associated with the particular user and that are currently stored on the backup storage, where each of the backup sets comprises a group of versions of a corresponding group of files backed up together, and where the received indication is further to delete all but a latest of the versions stored on the backup storage that is also still stored on a source storage;
      deleting, in response to determining that the first backup set meets one or more deletion conditions, the first backup set, where the one or more deletion conditions comprise a version visibility end time of the first backup set occurring after a start time of the performing;
      updating, in response to the deleting, pruning data to indicate a second backup set that is associated with the particular user and that is currently stored on the backup storage, the second backup set having a backup date that is more recent than the first backup date but older than any backup date of any other of the backup sets that are associated with the particular user and that are currently stored on the backup storage; and
      updating metadata to adjust effective start times of one or more of the versions.

2. The method of claim 1, further comprising determining if space freed by the pruning actions equals or exceeds the additional free space needed and, if not, repeating the pruning actions.

3. The method of claim 1, further comprising determining that an amount of free space on the backup storage is below a threshold.

4. The method of claim 1, further comprising determining that there is not enough free space to store a backup version of a file.

5. The method of claim 1 where the one or more deletion conditions are specified by a policy.

6. A system comprising:
   a computing device and at least one program module that are together configured for performing actions, the computing device comprising at least one processor and memory, the actions comprising:
      receiving, by the computing device, an indication that, prior to a completion of a started backup procedure, additional free space is needed on a backup storage to complete the started backup procedure, where the received indication comprises a notification that a free space capacity on the backup storage is less than or equal to a first threshold, and where the receiving comprises receiving a value that indicates a maximum amount of space to free;
      performing, by the computing device in response to receiving the indication, pruning actions until the free space capacity is equal to or greater than a second threshold, the pruning actions comprising:
         determining a first backup set that is associated with a particular user and that is currently stored on the backup storage, the first backup set having a first backup date, the first backup date being oldest of all backup dates for backup sets that are associated with the particular user and that are currently stored on the backup storage, where each of the backup sets comprises a group of versions of a corresponding group of files backed up together, and where the received indication is further to delete all but a latest of the versions stored on the backup storage that is also still stored on a source storage;
         deleting, in response to determining that the first backup set meets one or more deletion conditions, the first backup set, where the one or more deletions conditions comprise a version visibility end time of the first backup set occurring after a start time of the performing; and
         updating metadata to adjust effective start times of one or more of the versions.

7. The system of claim 6, the actions further comprising determining that an amount of free space on the backup storage is below a threshold.

8. The system of claim 6, the actions further comprising determining if space freed by the pruning actions equals or exceeds the additional free space needed and, if not, repeating.

9. A computer storage device comprising:
a memory storing computer-executable instructions that, when executed by at least one processor of a computing device, cause the computing device to perform actions comprising:
receiving, by the computing device, an indication that, prior to a completion of a started backup procedure, additional free space is needed on a backup storage used to store versions of files to complete the started backup procedure, where the received indication comprises a notification that a free space capacity on the backup storage is less than or equal to a first threshold, and where the receiving comprises receiving a value that indicates a maximum amount of space to free; and
performing, by the computing device in response to receiving the indication, pruning actions until the free space capacity is equal to or greater than a second threshold, the pruning actions comprising:
determining a first backup set that is associated with a particular user and that is currently stored on the backup storage, the first backup set having a first backup date, the first backup date being oldest of all backup dates for backup sets that are associated with the particular user and that are currently stored on the backup storage, where each of the backup sets comprises a group of versions of a corresponding group of files backed up together, and where the received indication is further to delete all but a latest of the versions stored on the backup storage that is also still stored on a source storage;
deleting, in response to determining that the first backup set meet one or more deletion conditions, the first backup set, where the one or more deletions conditions comprise a version visibility end time of the first backup set occurring after a start time of the performing; and
updating metadata to adjust effective start times of one or more of the versions.

10. The computer storage device of claim 9, further comprising repeating the pruning actions until at least the amount of space to free is freed or until the one or more deletion conditions cannot be met.

* * * * *